Patented Mar. 8, 1949

2,464,137

UNITED STATES PATENT OFFICE 2,464,137

ESTERS OF 2,3-EPOXYPROPYLMALONIC ACID AND THEIR PREPARATION

Harold Levy and Ralph Daniels, New York, N. Y., assignors, by mesne assignments, to William R. Warner & Co., Inc., New York, N. Y., a corporation of Delaware No Drawing. Application February 25, 1946, Serial No. 650,125

2 Claims. (Cl. 260—348)

This invention relates to novel esters of 2,3-epoxypropylmalonic acid and to a method for preparing them.

The structural formula of the new esters may be represented as follows:

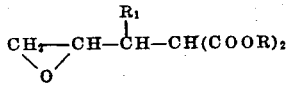

wherein R may be an aliphatic or aromatic radical, such as $C_3H_7$, $C_6H_5$, etc. and $R_1$ may be H or aliphatic.

The esters of this invention may be prepared by reacting a compound having the structural formula:

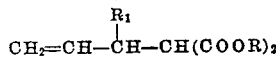

wherein R and $R_1$ have the same meanings as above, with peracetic acid, or with other peracids, such as perbenzoic acid and perphthalic acid.

This invention is further explained by the following examples which are intended for purposes of illustration and are not intended to be construed as limitations.

EXAMPLE I

Preparation of diethyl allylmalonate

A solution of sodium diethyl malonate was prepared in the usual manner from 34.5 grams (1.50 atoms) of sodium, 750 ml. of absolute ethanol, and 241 grams (1.51 moles) of diethyl malonate. To this solution was added allyl chloride (125.0 grams, 1.65 moles) during ¾ hour, with stirring and with no external heating or cooling. The reaction mixture was then refluxed 2 hours.

The mixture was concentrated in vacuo at about 15 mm., using a bath at about 55°–60° C., to remove most of the alcohol. The residue was cooled to room temperature and poured into 300 grams of an ice-water mixture. To this was added cold, 10% sulfuric acid until a definite acid reaction was achieved. The mixture was extracted with 7×100 ml. of ether and the ether extract washed successively with 100 ml. of cold, saturated sodium bicarbonate solution and 2×100 ml. of cold water. The washed ether solution was dried over anhydrous sodium sulfate, filtered, concentrated to remove ether, and the residue distilled. Two successive distillations through a Widmer column, containing a 250 mm. spiral, and Fenske-type column (625 mm. long, 10.5 mm. i. d., packed with 3 mm. glass helices, and arranged for total reflux and partial take-off) led to 164.6 grams (55% yield) of the diethyl allylmalonate, boiling point 117°–118° C. at 20 mm., $n_D^{25}$ 1.4278–1.4281.

EXAMPLE II

Preparation of diethyl-(2,3-epoxypropyl)-malonate

Para-toluenesulfonic acid monohydrate (0.2 grams) was dissolved in 31.75 ml. of 32.3% (weight/volume) hydrogen peroxide solution. To this solution was added acetic anhydride (170.6 grams). The addition was made with stirring during 1½ hours at 30°–35° C. The reaction mixture was then stirred for 2 hours and finally allowed to stand 20 hours, both at room temperature. The apparatus was protected from introduction of atmospheric moisture by placing tubes filled with anhydrous $CaCl_2$ at all openings to the air.

The solution was analyzed for peracetic acid content by adding acidified potassium iodide solution to an aliquot and then titrating the liberated iodine with standard thiosulfate solution. It was found to contain 0.00154 moles per ml.

15 grams (0.075 moles) of the diethyl allylmalonate were added to a mixture of 52 ml. of the above solution containing 0.080 mole of peracetic acid, 8 ml. of additional glacial acetic acid and 0.1 gram of fused sodium acetate at 30° C. The reactants were protected from atmospheric moisture by placing tubes filled with, e. g., anhydrous $CaCl_2$, at all openings to the air. The solution was then maintained for 112 hours at room temperature (about 25° C.). It was then concentrated in vacuo (about 15 mm. of mercury pressure), using a bath at about 40°–50° C. in order to remove most of the acetic acid. The residue was dissolved in ether (100 ml.) and the solution washed successively with 25 ml. of 8% sodium bisulfite solution, twice with saturated sodium bicarbonate solution (25 ml. being used each time), and twice with water (25 ml. being used each time). The washed solution was dried over anhydrous sodium sulfate, concentrated to remove ether, and the residue was distilled in vacuo (0.01–0.3 mm. of mercury pressure) up to a temperature of about 149° C. A redistillation of 3.1 grams of the distillate led to a yield of 2.4 grams of colorless liquid, boiling point 83°–87° C. under a pressure of 0.08 mm. of mercury, $n_D^{25}=1.4362$, $d_4^{25}=1.0947$, $M_D=51.68$, saponification equivalent=110. This was the desired material, diethyl 2,3 epoxypropyl malonate having the structural formula:

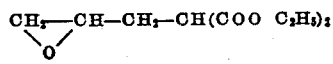

It was observed to have C, 55.62% and H, 7.27%. A second run involved the addition of the diethyl allylmalonate to the peracetic acid solution, in 200% excess, at 50° C. and the maintenance of the resulting solution at 50° C. for 6 hours and then at room temperature for 17 hours. The oxide was obtained in 32% yield. By using monoperphthalic acid instead of peracetic acid and proceeding as above, an improved yield of diethyl-(2,3-epoxypropyl)-malonate was obtained.

EXAMPLE III

Preparation of diethyl-(1-methyl-2-propenyl)-malonate 15.2 grams (0.168 moles) of 3-chloro-1-butene, $n_D^{20}=1.4147–1.4148$, were dissolved in 25 ml. of absolute ethanol. To this solution was added during 45 minutes a solution of sodium diethyl malonate, prepared in the usual manner from 3.8 grams (0.163 atom) of sodium, 150 cc. of absolute ethanol and 26.5 grams (0.165 moles) of diethyl malonate. The temperature was maintained at 20°–28° C. during the addition performed by pumping the sodium diethyl malonate from the vessel in which it was prepared into the reaction vessel under nitrogen gas pressure. The mixture was stirred for 45 minutes and allowed to stand at room temperature (about 25° C.) over night (16–17 hours). All of the foregoing operations were performed in the absence of atmospheric moisture, this condition being attained by means of tubes filled with, e. g., anhydrous $CaCl_2$, at all openings to the atmosphere.

The mixture was concentrated in vacuo (about 15 mm. mercury) to remove most of the ethanol by heating in a bath at 40°–50° C. The residue was cooled to room temperature (circa 20° C.) and 100 ml. of ice and water and then 10% sulfuric acid, bringing the pH to 6, were added. The acidified solution was extracted three times with ether (75 ml. of ether being used each time) and the combined ether extracts were washed successively with water (35 ml.), saturated sodium bicarbonate (50 ml.) and water (2×25 ml.).

The washed extract was dried over anhydrous sodium sulfate, filtered, concentrated to remove ether, and the residue was distilled.

The desired ester was obtained (10.2 grams) as a colorless liquid, boiling point 54° C. under 0.4 mm. mercury pressure to 56° C. under 0.25 mm. mercury pressure, $n_D^{25}=1.4305–1.4311$. Redistillation gave the pure compound, boiling point 61°–62° C. under 0.3 mm. mercury pressure, $n_D^{25}=1.4310$, $d_4^{25}=0.9894$, $M_D=56.06$.

EXAMPLE IV

Preparation of diethyl-(1-methyl-2,3-epoxypropyl)-malonate

Diethyl-(1-methyl-2-propenyl)-malonate (16.1 grams, 0.075 mole), prepared as described above, was mixed with 252 ml. of an ether solution of monoperphthalic acid (0.150 mole, 100% excess). The mixture was kept 8 days in the dark at room temperature.

After 1 gram of fused anhydrous sodium acetate was added the mixture was stirred 1 hour each at room temperature and at reflux. About 2/3 of the ether was removed by distillation at atmospheric pressure and the concentrated residue kept at room temperature for 45 hours.

The ether solution was filtered from precipitated phthalic acid, and then washed successively with saturated sodium bisulfite (10 ml.), saturated sodium bicarbonate (5×15 ml.) and saturated sodium chloride (2×5 ml.). The ether solution was then dried over anhydrous sodium sulfate, concentrated, and the residue distilled.

The epoxide was obtained in 51% yield (8.75 grams) as a colorless liquid, boiling point 84° C. (0.11 mm. of mercury)—87° C. (0.20 mm.), $n_D^{25}=1.4387–1.4396$.

The novel esters herein, prepared in accordance with the procedure described above, are useful as intermediates in the preparation of numerous organic compounds. For example, they may be used in the preparation of barbiturates. Many of the novel compounds are useful in the preparation of biologically-active substances. In addition, the novel compounds herein, being high boiling, viscous liquids, lend themselves to use as plasticizers.

The foregoing illustrates the practice of this invention, which however, is not to be limited thereby but is to be construed as broadly as permissible in view of the prior art and limited solely by the appended claims.

We claim:

1. Compounds having the structural formula $$CH_2\underset{O}{\overset{}{\diagdown\diagup}}CH-CH-CH(COOR)_2$$
$$\phantom{CH_2-CH-CH-CH(COOR)_2}|$$
$$\phantom{CH_2-CH-CH-CH(COOR)_2}R_1$$

wherein R is a member selected from the group consisting of alkyl groups containing not over three carbon atoms and the phenyl group, and $R_1$ is methyl.

2. The compound diethyl-(1-methyl-2,3-epoxypropyl)-malonate.

HAROLD LEVY.
RALPH DANIELS.

REFERENCES CITED

The following references are of record in the file of this patent:

UNITED STATES PATENTS

| Number | Name | Date |
|---|---|---|
| 1,974,917 | Halbig | Sept. 25, 1934 |
| 2,091,241 | Kvalnes | Aug. 24, 1937 |
| 2,237,265 | Shoule | Apr. 1, 1941 |
| 2,330,033 | D'Alelio | Sept. 21, 1943 |

OTHER REFERENCES

Gilman—Organic Chemistry. Vol. 1, page 634, 1943.

Hackh's Chemical Dictionary by Grant, 3rd Edition, 1944, page 36.